United States Patent
Baldock et al.

(10) Patent No.: US 7,895,796 B2
(45) Date of Patent: Mar. 1, 2011

(54) BUILDING SYSTEM, BUILDING ELEMENT AND METHODS OF CONSTRUCTION

(75) Inventors: Herbert John Baldock, Gladstone (AU); Shane William Baldock, Gladstone (AU)

(73) Assignee: BC&I ENVIRO SOLUTIONS Pty. Ltd., Gladstone, Queensland (AU)

( * ) Notice: Subject to any disclaimer, the term of this patent is extended or adjusted under 35 U.S.C. 154(b) by 10 days.

(21) Appl. No.: 12/297,413

(22) PCT Filed: Apr. 24, 2007

(86) PCT No.: PCT/AU2007/000535

§ 371 (c)(1),
(2), (4) Date: Mar. 2, 2009

(87) PCT Pub. No.: WO2007/121532

PCT Pub. Date: Nov. 1, 2007

(65) Prior Publication Data

US 2009/0301019 A1     Dec. 10, 2009

(30) Foreign Application Priority Data

Apr. 24, 2006  (AU) ............................ 2006902119

(51) Int. Cl.
*E04B 1/98*   (2006.01)
*E04H 9/00*   (2006.01)

(52) U.S. Cl. ............ 52/167.1; 52/404.1; 52/407.1; 52/407.5; 52/506.01; 52/506.06; 52/796.1; 52/782.1

(58) Field of Classification Search ........... 52/144–145, 52/782.1, 309.4–309.17, 404.1–404.5, 405.1–405.4, 52/406.1–406.3, 407.1–407.5, 415, 437–439, 52/506.01, 508, 783.1, 784.15, 794.1
See application file for complete search history.

(56) References Cited

U.S. PATENT DOCUMENTS

| | | | | |
|---|---|---|---|---|
| 2,048,901 A | * | 7/1936 | Vale | 52/92.2 |
| 2,970,373 A | * | 2/1961 | Kohl | 29/423 |
| 3,239,982 A | * | 3/1966 | Nicosia | 52/309.7 |
| 3,443,983 A | * | 5/1969 | Golding et al. | 428/416 |
| 3,562,985 A | * | 2/1971 | Nicosia | 52/241 |
| 4,517,782 A | * | 5/1985 | Shamszadeh | 52/309.7 |
| 4,604,843 A | * | 8/1986 | Ott et al. | 52/426 |
| 6,070,378 A | * | 6/2000 | Dumlao et al. | 52/263 |
| 6,080,495 A | * | 6/2000 | Wright | 428/623 |
| 6,385,942 B1 | * | 5/2002 | Grossman et al. | 52/798.1 |
| 6,420,309 B1 | * | 7/2002 | Grime et al. | 503/227 |
| 7,745,721 B2 | * | 6/2010 | Bezzel et al. | 136/243 |
| 2002/0029588 A1 | * | 3/2002 | Themont et al. | 65/17.6 |

OTHER PUBLICATIONS

Written Opinion of the International Searching Authority in PCT/AU2007/000535.

* cited by examiner

*Primary Examiner*—Jeanette E. Chapman
(74) *Attorney, Agent, or Firm*—Fitzpatrick, Cella, Harper & Scinto

(57) ABSTRACT

A building element (10) comprises a substantially metallic, substantially planar core member (20) and a thermally insulating and water resistant sheathing member (30) either side of the core member. The core member is continuous along a substantial length of the building element and a void (40) is created between the core member and at least one of the sheathing members. At least one bridging member (50) is provided in the void and couples the core member and at least one of the sheathing members. A building system and method of construction are also disclosed.

22 Claims, 7 Drawing Sheets

BUILDING SYSTEM, BUILDING ELEMENT AND METHODS OF CONSTRUCTION

FIELD OF THE INVENTION

This invention relates to a building system, a building element and methods of construction for the fabrication, installation and construction of domestic, residential, commercial and industrial structures.

BACKGROUND TO THE INVENTION

Many proposed methods of construction have been implemented in attempts to withstand or minimise the effects of tropical cyclones, hurricanes, tornados, natural terrain fires, tsunamis and the like. However, such proposed methods of construction have had limited tolerance of, and resistance to, these conditions, generally resulting in loss of fundamental sections of the structure or loss of the entire structure, irrespective of whether the structure is domestic, residential, commercial or industrial.

One principal disadvantage to current construction methods is the use of a timber or steel stud and batten type frame to which external wall claddings and finishings are attached. Such external claddings and finishings are prone to lifting and tearing or delamination from the framework in the aforementioned weather conditions, which leaves the structures susceptible to further damage, creates a deficiency in structural integrity and typically results in either partial or full loss of the structure.

Another disadvantage is that associated with current methods of roof construction. Sheet or tile type roofing systems or structures, fastened by screws, bolts, or adhesives, are generally also prone to delamination or separation from the structure. When this occurs alone, it exposes all internal sections of the structure protected by the roofing system to further damage. When it occurs in conjunction with the separation or delamination of the walls or cladding systems, this generally results in total loss of structural integrity, generally also with the final result being total loss of the structure.

A disadvantage found in methods used for in-situ, pre-cast concrete or tilt-panel slab lift technology construction, is the durability or sustainability of structures constructed with these methods. The instability found in these structures over a prolonged period of time results in fundamental degradation of the integrity of the structure due to several problematic systems, such as steel reinforcement, heat resistance, rapid cooling, etc.

Canadian Patent Application 2,412,174 discloses a modular building apparatus and method that is aimed at achieving the quick and simplified construction of calamity and theft resistant buildings particularly directed to applications in developing countries. The buildings include wall elements constructed from a plurality of corrugated light gauge steel cores bolted together and internal and external wall cladding. The lightweight nature of the wall elements render this system and method of construction vulnerable to extreme weather conditions and the aforementioned forces of nature. The corrugated nature of the cores and the need to bolt multiple sections together to form a core adds to the cost and complexity of production and construction. Similar problems would be encountered with the building elements and panels disclosed in the following documents: DE 2628801, GB 1,190,033 and WO 2004/076167. Many building panels and elements also comprise large apertures in the cores to keep the panels/elements lightweight and/or to route cables, and the like therethrough. Hence, the strength of, and structural integrity provided by, such panels is reduced rendering them unsuitable for structure that need to withstand the aforementioned conditions.

In this specification, the terms "comprises", "comprising" or similar terms are intended to mean a non-exclusive inclusion, such that a method, system or apparatus that comprises a list of elements does not include those elements solely, but may well include other elements not listed.

OBJECT OF THE INVENTION

It is an object of the present invention to provide a system, method and/or apparatus to address or at least ameliorate one or more of the aforementioned disadvantages of aforementioned prior art construction methods or to provide a useful commercial alternative.

SUMMARY OF THE INVENTION

In one form, although it need not be the only or indeed the broadest form, the invention resides in a building element comprising:

a substantially metallic, substantially planar core member, said core member being substantially solid and continuous along a substantial length of the building element;

a thermally insulating and water resistant sheathing member provided either side of said core member;

a void between the core member and at least one of the sheathing members; and at least one bridging member in the void coupling the core member and at least one of the sheathing members.

In another form, but again not necessarily the broadest form, the invention resides in a method of constructing a building, or part thereof, including the steps of:

erecting a substantially metallic, substantially planar core member, said core member being substantially solid and continuous along a substantial length of the core member;

coupling at least one bridging member to at least one side of the core member;

coupling a thermally insulating and water resistant sheathing member to said at least one bridging member on at least one side of the core member; and coupling a thermally insulating and water resistant sheathing member to an opposite side of said core member, or a bridging member if provided, such that a void exists between the core member and at least one of the sheathing members.

Suitably, the sheathing members are substantially parallel with the core member.

Suitably, the core member is continuous along an entire length of the building element. Alternatively, the core member may comprise perforations or apertures.

The core member may comprise multiple core member elements joined together.

Suitably, the substantially metallic core member is made from one or more of the following: steel, stainless steel, aluminium, nickel, alloys. However, the core member may also comprise one or more of the following materials: wood, glass, resin embedded sheets, polymers, fibreglass, polymer composite materials, fibre reinforced cement or other cementitious materials.

Suitably, the sheathing members are made from extruded or expanded polystyrene, which is preferably of a closed cell formation. Alternatively, the sheathing members comprise one or more of the following: coatings, layers, laminates, fibre reinforced cement, wood, resin embedded sheets, fibreglass, plasterboard, vinyls, plastics, cardboard based products, paint, fibre composites, polymer composite materials, or other cementitious materials.

The building element may further comprise insulation in at least one of the voids between the core member and at least one of the sheathing members. The insulation may be in the form of one or more of the following: polyester, woollen or fibreglass batts, fly ash, in situ insulation, open cell polystyrene.

Preferably, the sheathing members are coupled either side of the core member using one of the following techniques: adhesion, lamination, mechanical fastening.

Suitably, the building element is prefabricated.

In a further form, but again not necessarily the broadest form, the invention resides in a building system comprising a plurality of the building elements coupled together to form a structure, or part thereof.

In a yet further form, but again not necessarily the broadest form, the invention resides in a building, or part thereof, constructed using the aforementioned building element, building system or method of construction.

Suitably, the building part is a floor, a wall, a ceiling, a roof, a balcony, a verandah, a patio, a roof garden, a poolside, or other structure, or part thereof.

Further features of the present invention will become apparent from the following detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE INVENTION

The present invention, whilst ideally suitable for all types of construction worldwide, has been generally designed to overcome the partial or total loss of structures, when high loads or extreme conditions such as wind, rain, floods, tsunamis, hurricanes, tornados, etc., are imposed on the structure. The present invention is also designed to minimise the damage created by fires, such as natural terrain fires.

Figure 1:
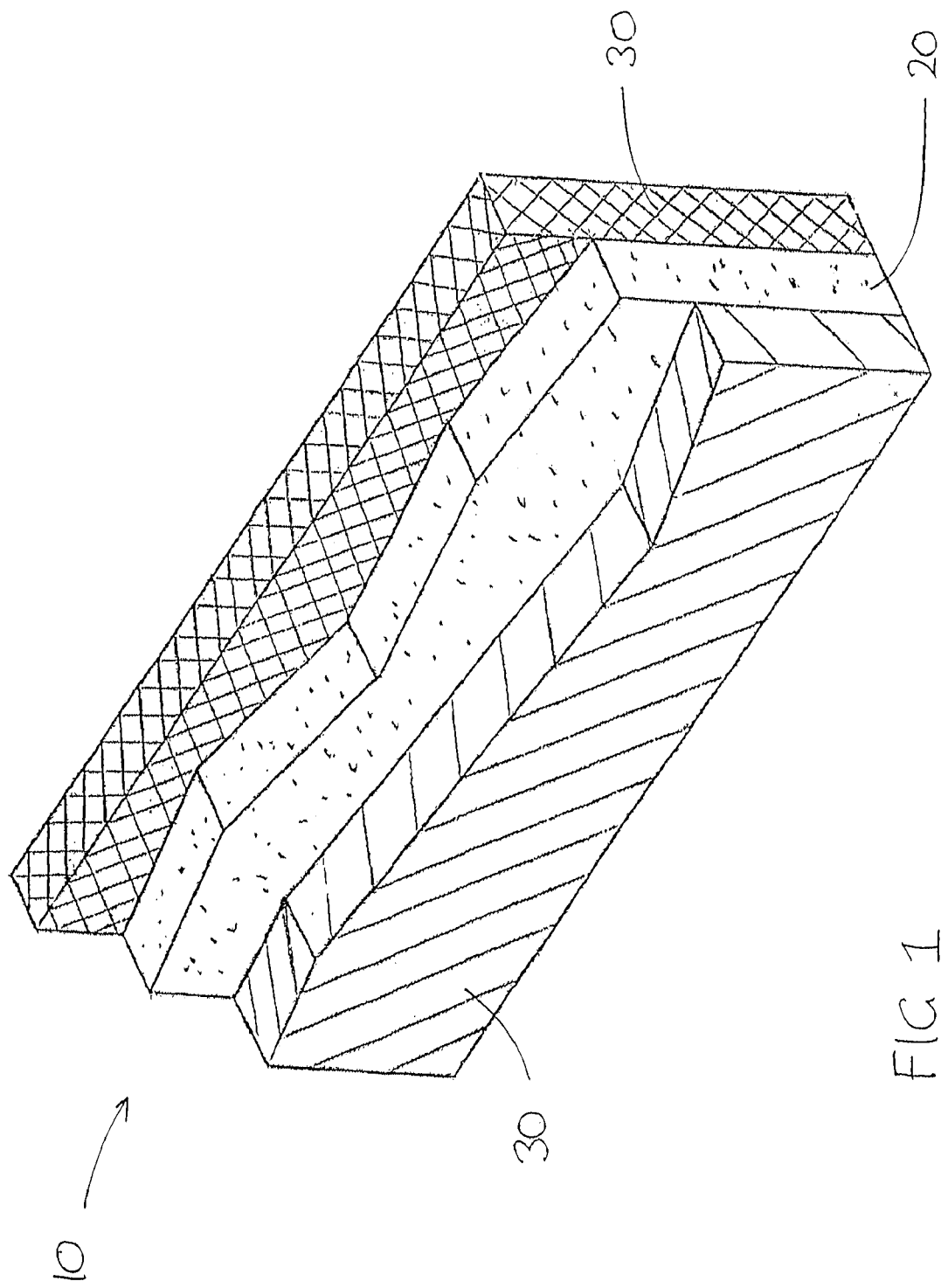
FIG. 1 is a front perspective, cut-away view of a building element according to a first embodiment of the present invention.

With reference to FIG. 1, a building element 10 is generally fabricated as a multiple part system comprising a substantially metallic, substantially planar core member 20, which may be susceptible to thermal expansion. Due to the need to prevent thermal expansion, sheathing members 30 are provided either side of the core member 20 to reduce, minimize or prevent thermal expansion. In addition to being thermally insulating, the sheathing members 30 are also water resistant and reduce, minimize or prevent oxidation of the core member 20 where oxidation of the core member 30 is possible. The sheathing members 30 also reduce, minimize or prevent other forms of degradation of the core member 30.

According to one embodiment, the core member 20 is substantially solid and of a thickness ranging from about 2 millimetres through to about 250 millimetres, depending on the application. Depending on the application, the core member 20 is made from one or more of the following: steel, stainless steel, aluminium, nickel, alloys. Although the core member 20 is substantially metallic, some embodiments of the core member can comprise one or more of the following: wood, glass, resin embedded sheets, polymers, fibreglass, polymer composite materials, fibre reinforced cement or other cementitious materials. Depending on the application, the core member can be continuous along a substantial length of the building element 10 or comprise perforations or apertures. The continuous nature of the core member 20 is preferably achieved without joins in the core member. However, according to some embodiments, the continuous nature of the core member 20 can be achieved by joining multiple core member elements together using any suitable joining means known in the art.

The sheathing members 30, which may be a sheeting, coating, layer or laminate, provide sufficiently high insulation and vapour resistance to minimize thermal expansion in the core member 20, which prevents wear or damage to the core member 20 or loss of structural integrity thereof. According to one embodiment, the sheathing members 30 are laminated, adhered, or fastened directly to the core member 20 using a high strength adhesive or mechanical fastening system or any other conventional techniques known in the art. In one embodiment, the sheathing members 30 are substantially parallel with the core member 20.

In a preferred embodiment of the present invention, the sheathing members are of a thickness ranging from about 1 millimetre to about 500 millimetres and are preferably of an extruded or expanded polystyrene product, preferably of a closed cell formation. Examples of such materials include Dow Chemicals Styrofoam SMTG, Owens Corning Foamular Metric, R-Max Exin-Tex or Exin-Flex, Pactiv Green Guard, ISO-Foam, ISO-Board. In other embodiments, the sheathing members 30 comprise one or more of the following: fibre reinforced cement, wood, resin embedded sheets, fibreglass, plasterboard, steel, stainless steel, aluminium, vinyls, plastics, cardboard based products, insulating paint, fibre composites, polymer composite materials, or other cementitious materials. The sheathing members 30 hold properties including, yet not limited to, thermal resistance, water resistance, the ability to prevent or minimise oxidisation of the core member 20, the ability to prevent or minimise wear or damage of the core member 20 and/or the ability to reduce the likelihood of full or partial loss of structural integrity of the core member 20. In some extreme weather conditions, whilst the sheathing members 30 may ultimately be torn from the structure, the core members 30 of the building elements 10 and therefore the structural integrity of the building structure will remain.

Figure 2:
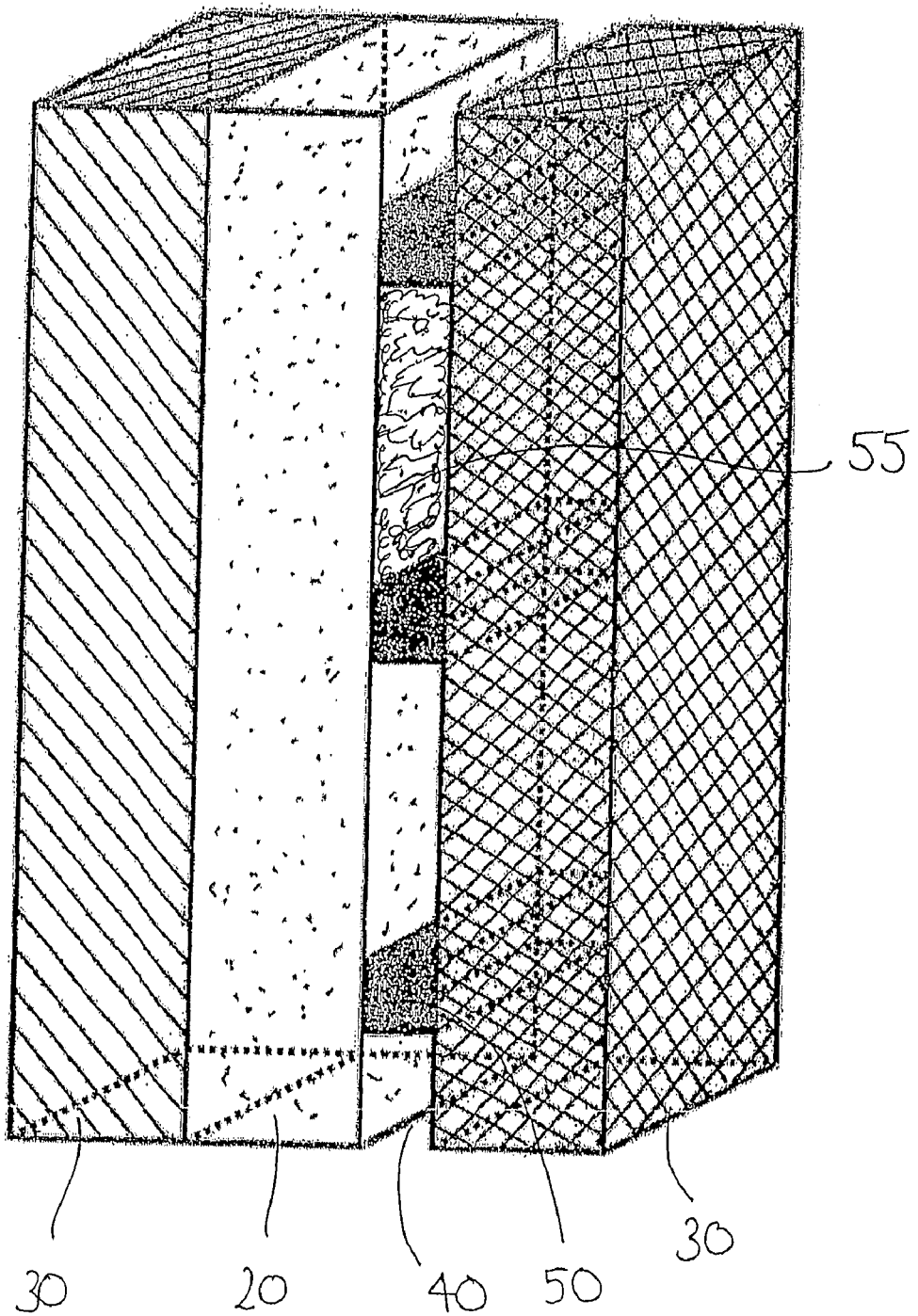
FIG. 2 is a front perspective view of a building element according to a second embodiment of present invention.

With reference to FIG. 2, another embodiment of the building element of the present invention comprises a void 40 between the core member 20 and one of the sheathing members 30 and at least one bridging member 50 in the void 40 coupling the core member 20 and the adjacent sheathing member 30. The other sheathing member 30 is laminated or joined directly to the core member 30. The bridging members 50 can be in the form of risers, spacers, washers, pre-existing building or construction separators, such as purlins, cleats, hi-hats, or other bridging systems.

Figure 3:
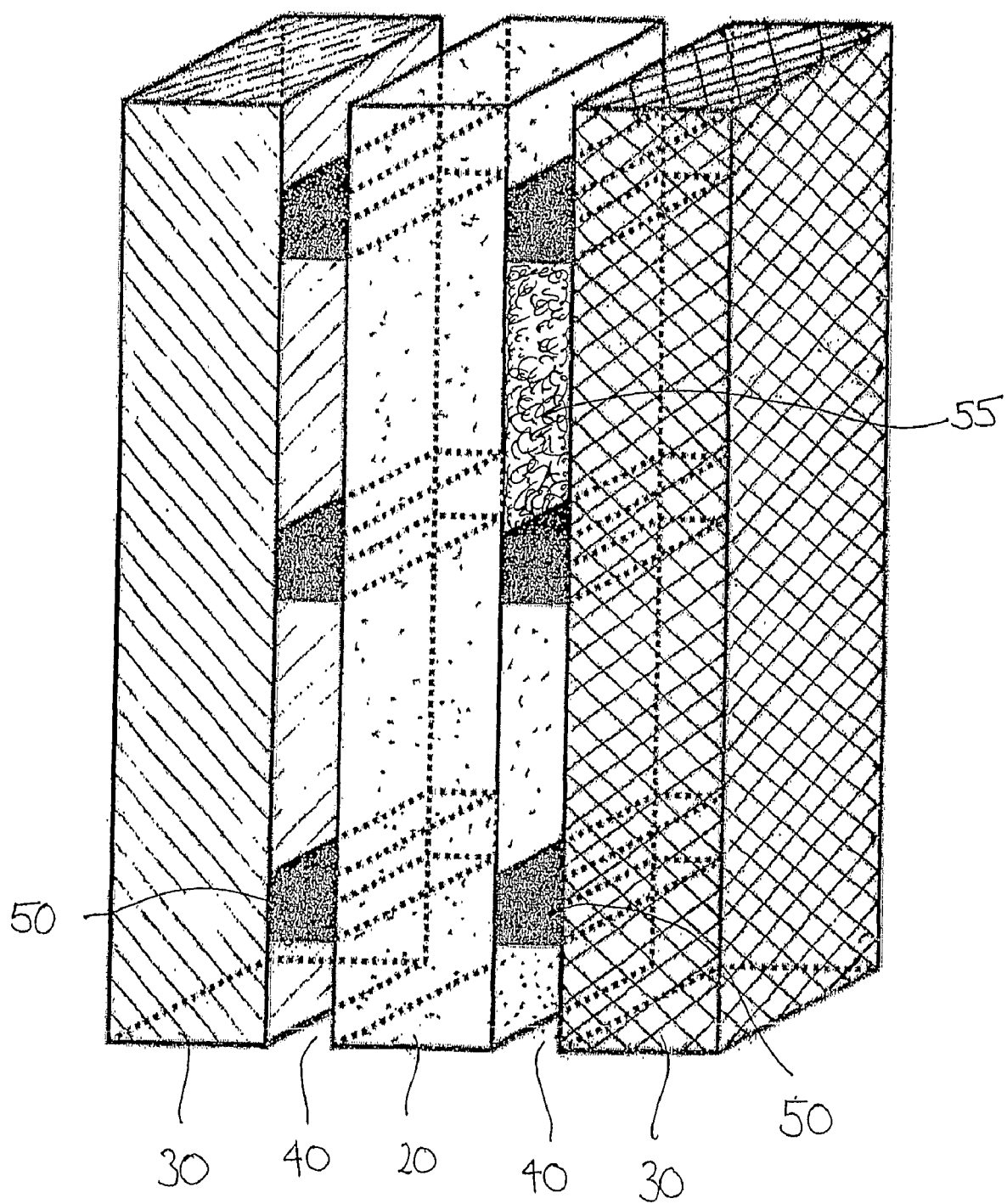
FIG. 3 is a front perspective view of a building element according to a third embodiment of present invention.

With reference to FIG. 3, another embodiment of the building system or prefabricated building element of the present invention comprises voids 40 between the core member 20 and each sheathing member 30 and at least one bridging member 50 is provided in the voids 40 to couple the core member 20 and the adjacent sheathing members 30.

Where one or more voids 40 are provided between the core member 30 and the sheathing members 30, the insulating nature of the void(s) can change the requirements of the sheathing member(s) 30 on the side of the core member that the void(s) 40 is/are provided. For example, where an insulating void 40 is provided, the sheathing member 30 on that side of the core member 20 can be thinner and/or of a different composition because of the additional protection provided to the core member 20 by the void 40.

As shown in FIGS. 2 and 3, according to some embodiments, insulation 55 can be provided in at least one of the voids 40 between the core member 20 and at least one of the sheathing members 30 such that the insulation at least partially fills the void 40. The insulation may be in the form of one or more of the following: polyester, woollen or fibreglass batts, fly ash, in situ insulation, open cell polystyrene. Where insulation is provided in both voids 50, the type of insulation in one or more voids on one side of the core member 20 can differ from the type of insulation provided in the one or more voids 50 on the other side of the core member 20. The nature of the insulation 55 can change the requirements of the sheathing member(s) 30 on the side of the core member 20 that the insulation 55 is/are provided.

Figure 8:
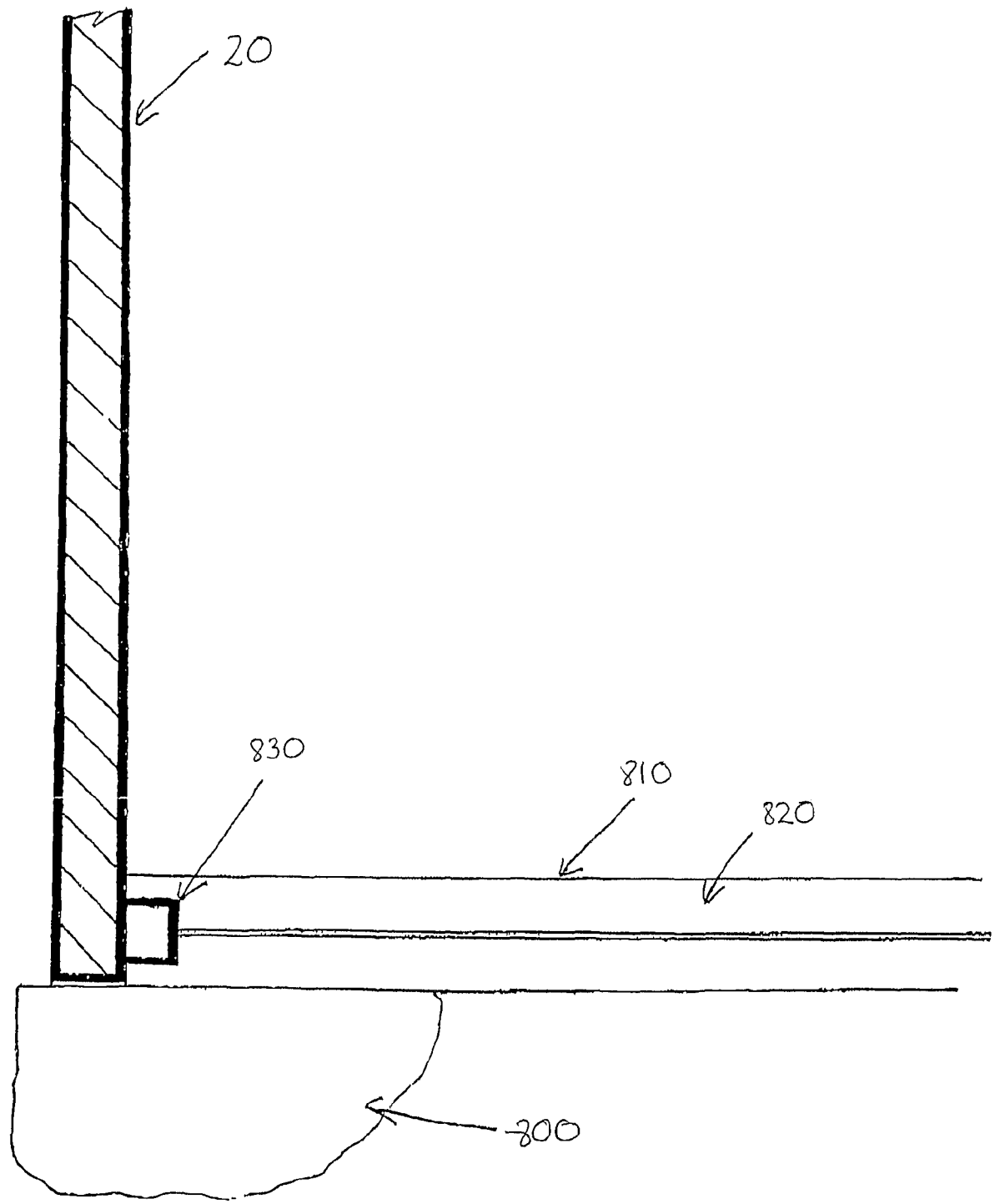
FIG. 8 is a sectional view showing a method of coupling a core member of a building element to a foundation of a structure.

A structure can be constructed with the core member 20 and sheathed with the sheathing members 30 in situ. For example, with reference to FIG. 8, a reinforced concrete foundation 800 is created in a first pour and a reinforced concrete floor 810 is created on the foundation 800 in a second pour. Core member 20 is secured to reinforcing 820 of the floor 810 with a wall tie 830 or other mechanical fixing or fastening. Sheathing members 30 can then be coupled to the core member 20 in situ as described herein. Alternatively, the building elements 10 can be prefabricated and transported to the site for installation. Generally, walls are fixed to a floor with a bolted fixing system, but may be erected or joined using welding, fasteners, such as screws or nails, adhesives or other bonding agents. Any combination of these methods can also be acceptable depending on the particular application. Hence, according to another aspect, the present invention comprises a building system in which a plurality of building elements 10, whether prefabricated or constructed on site, are coupled together using one or more of the aforementioned mechanisms to form a structure, or part thereof.

A structure can be built using the building system or building elements 10 of the present invention and will be built in accordance with the relevant local building standards and regulations. For example, a floor constructed of the building elements 10 can be set onto a known structural load bearing system. Alternatively, the floor structure will be fastened to a slab or base substrate with mechanical or chemical fasteners.

Non-structural or non-load bearing internal walls, are preferably constructed using the building system of the present invention, but also may be fabricated with a normal stud configuration in accordance with local standards or regulations, or of an in-situ or pre-cast concrete or matrix system. Sheathings, cladding, coverings or coatings for internal walls can be erected or constructed using plasterboard, paper or cardboard based products, fibre reinforced cement sheet, or fibreglass sheeting. Other internal sheathings, coatings or linings may be acceptable.

The internal wall is generally fixed to a wall or roof constructed from the building elements 10 via a cleating or flange utilising a mechanical fastening system, but can also be welded, depending on the systems used and/or design of internal non-structural or non-load bearing walls. Load bearing walls are installed as per structural engineering requirements and/or as per load bearing structure requirements defined by local standards and/or regulations.

The roof structure, if required, is supported by either one, or several load bearing member(s) as per structural engineering requirements, and/or local standards and/or regulations. Generally, the roof is fabricated of a curved, convex, or concave shape, with the deflection of the arc not exceeding structural engineering specifications. The roof structure may also be of other designs, acceptable in accordance with local building requirements and structural specifications. The roof is fabricated using the building system/elements of the present invention and is initially installed with the core member 20 being fixed to the structure using a bolted fixing system, welding, screws, nails, adhesives or bonding agents. Any combination of these methods is acceptable.

Figure 7:
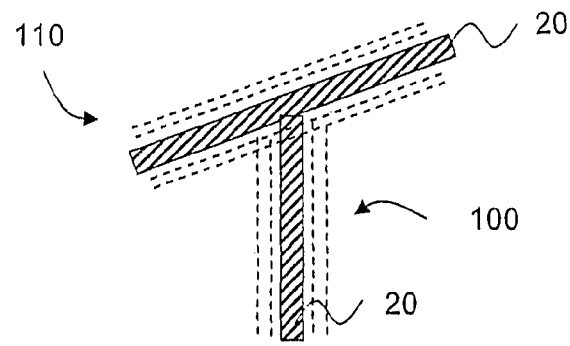
FIG. 7 is a sectional view showing a building element forming part of a roof coupled to a building element forming part of a wall of a structure.

With reference to FIG. 7, in a preferred embodiment, the core member(s) 20 of one or more building elements 10 forming a wall 100, or part thereof, of a structure are coupled to the core member(s) 20 of one or more building elements 10 forming a roof 110, or part thereof, of the structure. The core members 20 of the building elements 10 forming the walls and roof can be coupled together using any known fastening means, such as a bolted fixing system, welding, screws, nails, adhesives or bonding agents or a combination thereof. Coupling together of the core members 20 increases structural integrity and resistance of the structure to forces of nature. In FIG. 7, the sheathing members 30 are depicted in dotted lines for the sake of clarity.

Standard internal ceilings can be formed from sheathings, linings or coatings, which can be fixed or applied to the internal sheathing member 30 of the building elements 10. Variations to this method include suspended ceilings and other architectural features. Sheathings, linings and coatings may include, yet are not limited to, plasterboard, paper or cardboard based products, fibre reinforced cement sheeting, fibreglass sheeting, polymer modified texture coats, paint, and/or other sheathing, lining or coating systems.

Figure 4:
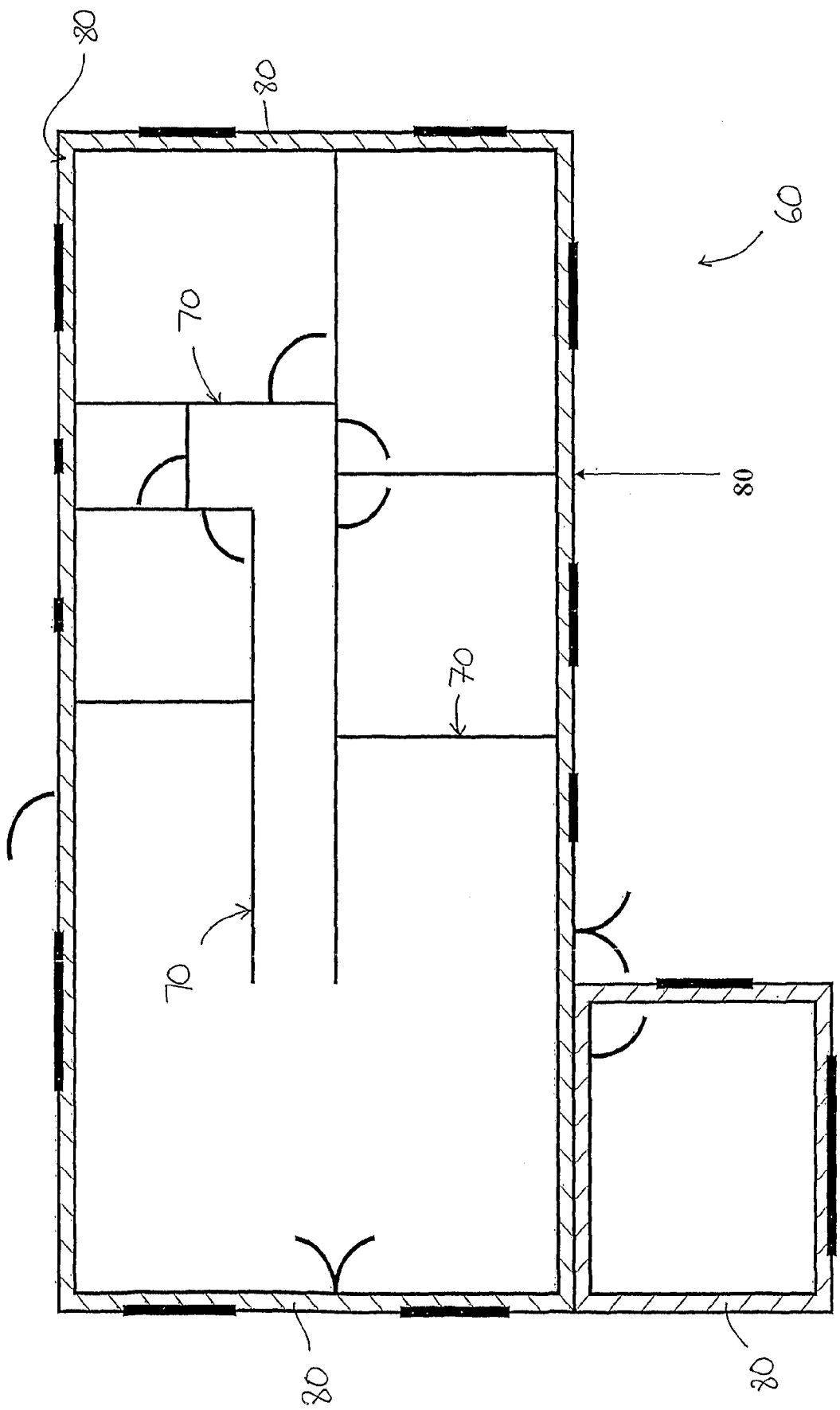
FIG. 4 is a plan view of a building constructed using one or more embodiments of the present invention.

FIG. 4 depicts a single storey residential structure 60, that has been constructed using the present invention. All internal and non structural walls 70 can be built using the present invention, yet conventional building and construction methods may be used for non-structural walls. However, structural walls 80 are preferably built using the present invention, yet other designs meeting structural requirements and building regulations can be employed in conjunction with the present invention. While the present invention confers superior structural properties on the structure 60, all structural members and sections must be in accordance with structural engineering specifications according to each individual design.

Figure 5:
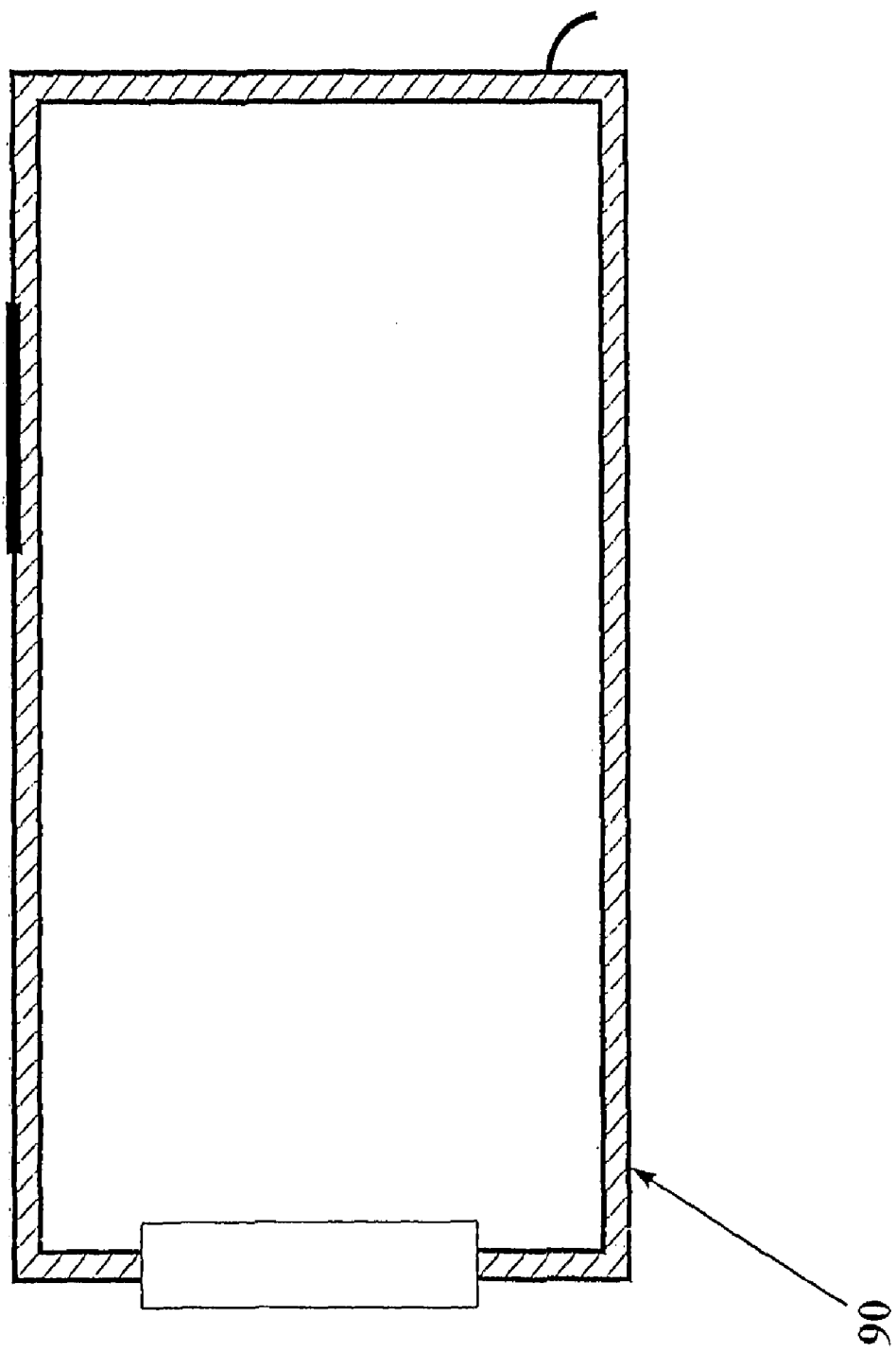
FIG. 5 is a plan view of another building constructed using one or more embodiments of the present invention.

FIG. 5 depicts domestic, commercial, or industrial shed or warehouse 90, being of a size not requiring load bearing members in the roofing system. However, structures requiring load bearing members incorporated in the roofing system are capable of being designed using the present invention providing the correct structural specifications for each individual design are followed.

Figure 6:
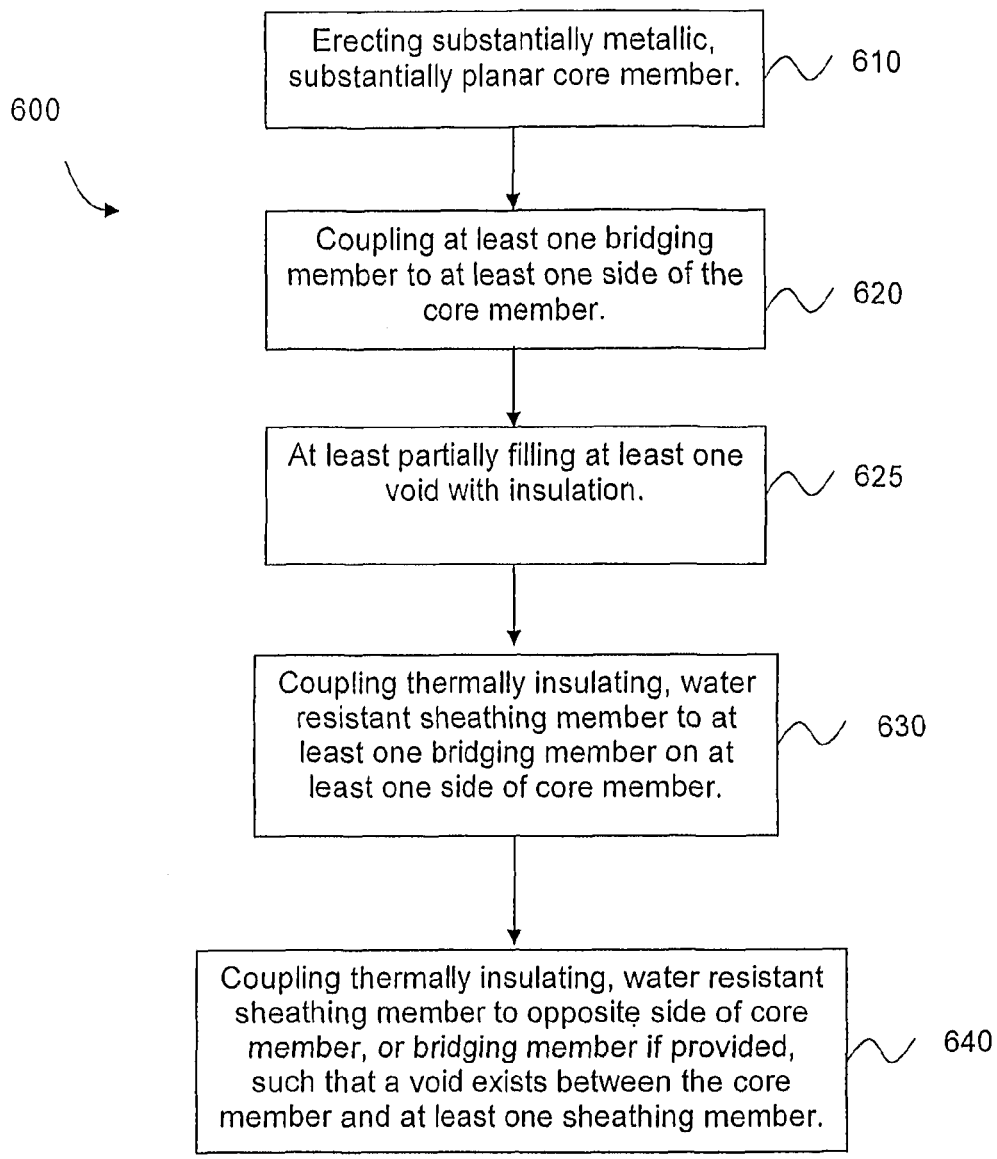
FIG. 6 is a flowchart illustrating a method of construction in accordance with embodiments of the present invention.

A method of construction 600 according to embodiments of the present invention will now be described with reference to the flowchart depicted in FIG. 6.

The method 600 includes at step 610 erecting a substantially metallic, substantially planar core member 20. The core member 20 is continuous along a substantial length of the core member 20 to impart significant structural integrity to the building element 10 and the structure constructed therewith. The method includes at step 620 coupling at least one bridging member 50 to at least one side of the core member 20. In other embodiments, at least one bridging member 50 is also coupled to an opposite side of the core member 20. At step 625, the method may include at least partially filling at least one of the voids 50 between the core member 20 and at least one of the sheathing members 30 with insulation of the type described above. At step 630, the method includes coupling the thermally insulating and water resistant sheathing member 30 to the at least one bridging member 50 on one side of the core member 20. The method also includes at step 640 coupling another thermally insulating and water resistant sheathing member 30 to the opposite side of said core member 20, or to a bridging member 50 if provided on the opposite side, such that a void 40 exists between the core member 20 and at least one sheathing member 30. A void will also exist between the core member 20 and the other sheathing member 30 where at least one bridging member 50 is provided on both sides of the core member 20.

The method, system and building element 10 of the present invention thus provides a solution to the aforementioned problems of the prior art by virtue of core member 20 providing rigidity to the building element and structures built therefrom. The thermally insulating and water resistant sheathing members 30 protect the core member 20 from the deleterious effects of thermal expansion, oxidation and/or moisture and can contribute to the structural integrity of the building element and structures constructed therefrom, particularly when the core members of, for example, walls and roofs are coupled together as described herein. The building system, building element and the method of construction can be used for building any structure or part thereof and can be used for floors, walls, ceilings, roofs, balconies, verandahs, patios, roof gardens, pool-sides, or other structures, or parts thereof, to provide a robust structure resistant to the forces typically encountered in severe weather conditions. Furthermore, the substantially planar nature of the core member 30 avoids the complex shapes of the core members of the prior art, thus keeping production costs down. The substantially continuous nature of the core member 30 also contributes to the structural integrity of both the building element 10 and structures constructed therefrom.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A building element comprising:
a substantially metallic, substantially planar core member, said core member being substantially solid and continuous along a substantial length of the building element;
a thermally insulating and water resistant sheathing member provided either side of said core member;
a void between the core member and at least one of the sheathing members; and
at least one bridging member in the void coupling the core member and at least one of the sheathing members.

2. The building element as claimed in claim 1, wherein the sheathing members are substantially parallel with the core member.

3. The building element as claimed in claim 1, wherein the core member is continuous along an entire length of the building element.

4. The building element as claimed in claim 1, wherein the core member comprises multiple core member elements joined together.

5. The building element as claimed in claim 1, wherein the core member is made from one or more of the following: steel, stainless steel, aluminium, nickel, alloys.

6. The building element as claimed in claim 1, wherein the core member comprises one or more of the following: wood, glass, resin embedded sheets, polymers, fibreglass, polymer composite materials, fibre reinforced cement or other cementitious materials.

7. The building element as claimed in claim 1, wherein the sheathing members are made from one or more of the following: extruded polystyrene, expanded polystyrene, a coating, a layer, a laminate, fibre reinforced cement, wood, resin embedded sheets, fibreglass, plasterboard, vinyls, plastics, cardboard based products, paint, fibre composites, polymer composite materials, or other cementitious materials.

8. The building element as claimed in claim 7, wherein the polystyrene is of a closed cell formation.

9. The building element as claimed in claim 1, wherein the sheathing members are coupled either side of the core member using one of the following techniques: adhesion, lamination, mechanical fastening.

10. The building element as claimed in claim 1, further comprising insulation in at least one of the voids between the core member and at least one of the sheathing members.

11. The building element as claimed in claim 10, wherein the insulation is in the form of one or more of the following: polyester, woollen or fibreglass batts, fly ash, in situ insulation, open cell polystyrene.

12. The building element as claimed in claim 1, wherein the building element is prefabricated.

13. A building system comprising a plurality of the building elements as claimed in claim 1 coupled together to form a structure, or part thereof.

14. The building system as claimed in claim 13, wherein the core member of one or more building elements forming a wall, or part thereof, is coupled to the core member of one or more building elements forming a roof, or part thereof.

15. A method of constructing a building, or part thereof, including the steps of:
erecting a substantially metallic, substantially planar core member, said core member being substantially solid and continuous along a substantial length of the core member;
coupling at least one bridging member to at least one side of the core member;
coupling a thermally insulating and water resistant sheathing member to said at least one bridging member on at least one side of the core member; and
coupling a thermally insulating and water resistant sheathing member to an opposite side of said core member, or a bridging member if provided, such that a void exists between the core member and at least one sheathing member.

16. The method of constructing a building as claimed in claim 15, wherein coupling the thermally insulating and water resistant sheathing members to the core member or the at least one bridging member includes one of the following techniques: adhesion, lamination, mechanical fastening.

17. The method of constructing a building as claimed in claim 15, further including the step of coupling the core member(s) of one or more building elements forming a wall, or part thereof, to the core member(s) of one or more building elements forming a roof, or part thereof.

18. The method of constructing a building as claimed in claim 15, further including the step of coupling the core member(s) of one or more building elements forming a wall, or part thereof, to reinforcement in a foundation or floor of the building.

19. The method of constructing a building as claimed in claim 15, further including the step of at least partially filling at least one of the voids between the core member and at least one of the sheathing members with insulation.

20. A building, or part thereof, constructed using the building element as claimed in claim 1.

21. A building, or part thereof, constructed using the building system as claimed in claim 13.

22. The building, or part thereof, as claimed in claim 20, wherein the building part is a floor, a wall, a ceiling, a roof, a balcony, a verandah, a patio, a roof garden, a poolside, or part thereof.

* * * * *